US008744483B2

United States Patent
Lee et al.

(10) Patent No.: US 8,744,483 B2
(45) Date of Patent: Jun. 3, 2014

(54) METHOD AND APPARATUS FOR UPDATING LOCATION INFORMATION FOR A TERMINAL

(75) Inventors: Jae Wook Lee, Anyang-si (KR); Sung Jun Park, Anyang-si (KR); Sung Hoon Jung, Anyang-si (KR); Young Dae Lee, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 19 days.

(21) Appl. No.: 13/519,714

(22) PCT Filed: Jan. 13, 2011

(86) PCT No.: PCT/KR2011/000237
§ 371 (c)(1),
(2), (4) Date: Jun. 28, 2012

(87) PCT Pub. No.: WO2011/087290
PCT Pub. Date: Jul. 21, 2011

(65) Prior Publication Data
US 2012/0309419 A1    Dec. 6, 2012

Related U.S. Application Data

(60) Provisional application No. 61/294,815, filed on Jan. 13, 2010.

(30) Foreign Application Priority Data

Jan. 12, 2011 (KR) .......................... 10-2011-0003070

(51) Int. Cl.
*H04W 24/00* (2009.01)

(52) U.S. Cl.
USPC ....................................................... 455/456.1

(58) Field of Classification Search
CPC ...... H04W 8/18; H04W 60/04; H04W 74/008
USPC ......... 455/436, 437, 438, 439, 440, 441, 442, 455/525, 331, 332; 370/331, 332
See application file for complete search history.

(56) References Cited

U.S. PATENT DOCUMENTS

2008/0102896 A1*  5/2008  Wang et al. ................... 455/560
2008/0220782 A1*  9/2008  Wang et al. ................... 455/436

(Continued)

OTHER PUBLICATIONS

Chew et al., "A Hybrid Mobile-based Patient Location Tracking System for Personal Healthcare Applications", IEEE, 2006, pp. 5188-5191.

(Continued)

*Primary Examiner* — German J Viana Di Prisco
*Assistant Examiner* — Jose M Rodriguez Colon
(74) *Attorney, Agent, or Firm* — Birch, Stewart, Kolasch & Birch, LLP

(57) ABSTRACT

Discloses is a method for transmitting cell change instruction information, which is to be performed by a terminal in a wireless communication system. The method for transmitting cell change instruction information includes: selecting or reselecting a second cell from a first cell; comparing a first cell ID of the first cell with a second cell ID of the second cell, or comparing a first tracking area code (TAC) of the first cell with a second TAC of the second cell; and transmitting cell change instruction information to a network when the result of the comparison shows that the first cell ID does not match the second cell ID or the first TAC does not match the second TAC.

7 Claims, 9 Drawing Sheets

(56) References Cited

U.S. PATENT DOCUMENTS

| | | |
|---|---|---|
| 2011/0035584 A1* | 2/2011 | Meyerstein et al. .......... 713/155 |
| 2013/0182632 A1* | 7/2013 | Maeda et al. ................. 370/312 |
| 2013/0203450 A1* | 8/2013 | Mochizuki et al. ........... 455/458 |

OTHER PUBLICATIONS

Laitinen et al., "Database Correlation Method for GSM Location", IEEE, 2001, pp. 2504-2508.

* cited by examiner

METHOD AND APPARATUS FOR UPDATING LOCATION INFORMATION FOR A TERMINAL

CROSS REFERENCE TO RELATED APPLICATIONS

This application is the National Phase of PCT/KR2011/000237 filed on Jan. 13, 2011, which claims priority under 35 U.S.C. 119(e) to U.S. Provisional Application No. 61/294,815 filed on Jan. 13, 2010 and under 35 U.S.C. 119(a) to Patent Application No. 10-2011-0003070 filed in Republic of Korea on Jan. 12, 2011, all of which are hereby expressly incorporated by reference into the present application.

BACKGROUND OF THE INVENTION

1. Field of the Invention

The present invention relates to wireless communications, and more particularly, to a method and apparatus for updating location information of a terminal.

2. Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

Recently, a machine type communication (MTC) system which performs communication between machines without intervention of a human user is actively utilized. A service provided through MTC is differentiated from the conventional communication service requiring human intervention, and its service range is various as follows. For example, the MTC can provide various services such as tracking, metering, monitoring, payment, medical field services, remote controlling, etc. An MTC device, which is a user equipment used in the MTC, can have a limited mobility, and a plurality of MTC devices can exist in a cell.

When the conventional paging procedure is used to deliver a paging message to a plurality of user equipments in a system (e.g., an MTC system) in which the plurality of user equipments having mobility with a limited range operate, it may cause a load problem in a core network and a radio interface. To solve this problem, the core network needs to obtain location information of the user equipment, and when the location information of the user equipment is changed, for example, when there is a change in a cell in which the user equipment operates, there is a need to consider a method for reporting the change to the core network to update the location information.

SUMMARY OF THE INVENTION

The present invention provides a method for reporting a change in a cell in which a terminal is located and an apparatus for supporting the method in an environment where a plurality of static or semi-static terminals having a little mobility operates.

The present invention also provides a method for defining a tracking area (TA) specialized for a plurality of static or semi-static terminals having a little mobility and for performing a tracking area update (TAU) of the specialized TA, and an apparatus for performing the method.

In an aspect, a method of transmitting cell change indication information, which is performed by a terminal in a wireless communication system, includes selecting or reselecting a second cell from a first cell, comparing a first cell identifier (ID) of the first cell with a second cell ID of the second cell, or comparing a first tracking area code (TAC) of the first cell with a second TAC of the second cell, and transmitting the cell change indication information to a network when the result of the comparison shows that the first cell ID does not match the second cell ID or the first TAC does not match the second TAC.

The cell change indication information may include at least one of an ID of a machine type communication (MTC) terminal and the second cell ID.

The cell change indication information may include at least one of an ID of an MTC terminal and a tracking area (TA) ID.

The TA ID may be in association with the second TAC.

The method may further include receiving at least one of the first TAC and the second TAC through system information.

The method may further include storing at least one of the received first TAC and second TAC.

In another aspect, a method of receiving cell change indication information by a network in a wireless communication system, includes transmitting system information including at least one of a first tracking area code (TAC) of a first cell and a second TAC of a second cell to a user device and a machine type communication (MTC) device, and receiving the cell change indication information from the MTC device.

the MTC device may be a device for performing communication without human intervention.

The cell change indication information may include at least one of an identifier (ID) of the MTC device and a second cell ID of the second cell.

The cell change indication information may include at least one of an ID of the MTC device and a tracking area (TA) ID.

The TA ID may be in association with the second TAC.

The method may further include storing the received cell change indication information.

According to the present invention, with the introduction of a procedure of a tracking area (TA) update and a cell report for a terminal having a little mobility, a core network can more specifically recognize a location of the terminal. Therefore, it is possible to decrease a load which may be generated in a radio channel and the core network in the paging procedure for the terminal.

DESCRIPTION OF EXEMPLARY EMBODIMENTS

Figure 1:
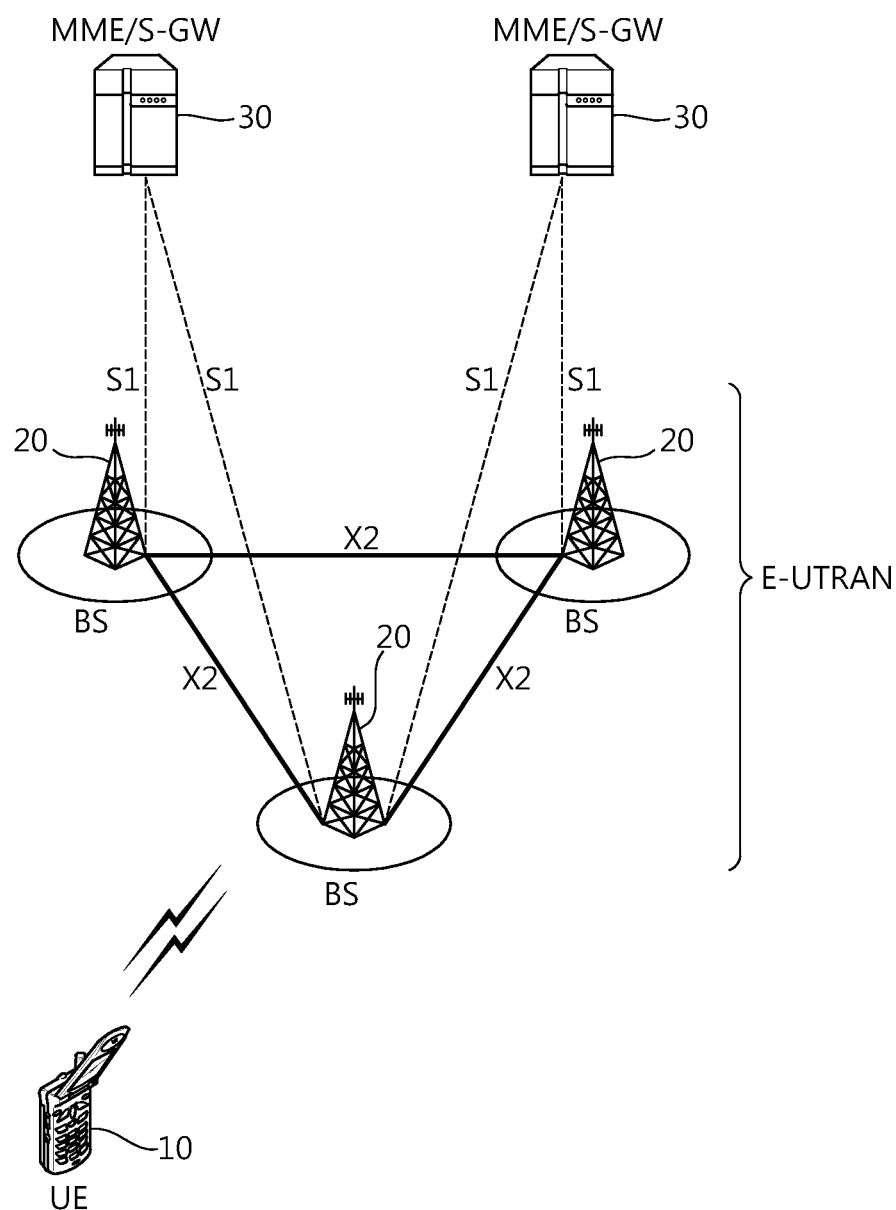
FIG. 1 shows an example of a wireless communication system to which the present invention is applicable.

FIG. 1 shows an example of a wireless communication system to which the present invention is applicable. The present invention can apply to an evolved-UMTS terrestrial radio access network (E-UTRAN) or a long term evolution (LTE)/LTE-A system.

The LTE system is a mobile communication system evolved from the UMTS system, and its standardization work is under progress in the $3^{rd}$ generation partnership project (3GPP) which is an international standard organization.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Figure 2:
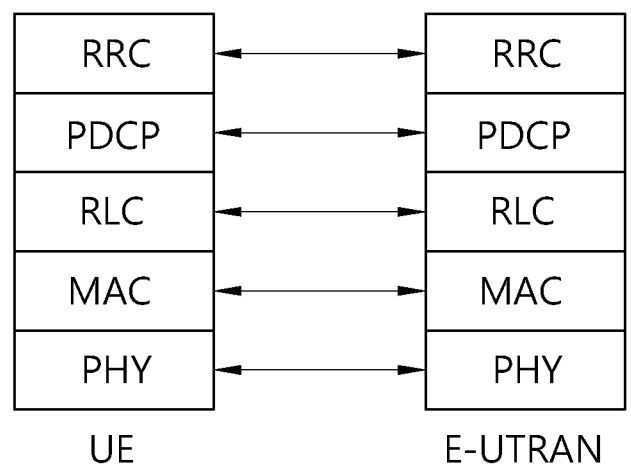
FIG. 2 and FIG. 3 each show a structure of a C-plane and a U-plane of a radio protocol of an LTE system.
Figure 3:
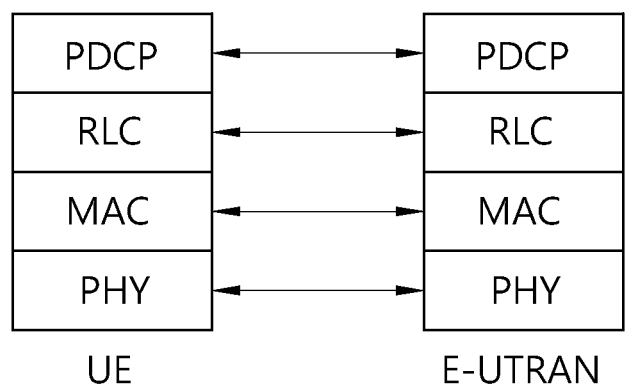

A radio interface protocol is defined in a Uu interface which is a radio section. The radio interface protocol horizontally consists of a physical layer, a data link layer, and a network layer, and is vertically divided into a user plane (U-plane) for user data transmission and a control plane (C-plane) for control signal delivery (signaling). On the basis of the three lowest layers of a well-known open system interconnection (OSI) standard model, as shown in FIG. 2 and FIG. 3, the radio interface protocol can be generally divided into a first layer (L1) including a physical (PHY) layer, a second layer (L2) including medium access control (MAC)/ radio link control (RLC)/packet data convergence protocol (PDCP) layers, and a third layer (L3) including a radio resource control (RRC) layer. These layers are present in pair in a UE and an E-UTRAN, and serve for data transmission of the Uu interface.

FIG. 2 and FIG. 3 each show a structure of a C-plane and a U-plane of a radio protocol of an LTE system.

A PHY layer, which is a first layer, provides an information transfer service to a higher layer by using a physical channel. The PHY layer is connected with a higher layer, i.e., a MAC layer, through a transport channel. Data between the MAC layer and the PHY layer is transferred through the transport channel. In this case, the transport channel is roughly divided into a dedicated transport channel and a common transport channel according to whether to share the channel. Further, between different PHY layers, i.e., between a PHY layer of a transmitting side and a PHY layer of a receiving side, data is transferred through a physical channel by using a radio resource.

There are several layers in the second layer. First, a MAC layer serves to map various logical channels to various transport channels, and also serves to perform logical channel multiplexing in which several logical channels are mapped to one transport channel. The MAC layer is connected with a higher layer, i.e., an RLC layer, through a logical channel. According to a type of information to be transmitted, the logical channel is roughly divided into a control channel for transmitting information of the C-plane and a traffic channel for transmitting information of the U-plane.

An RLC layer of the second layer serves to regulate a data size so that the data size is suitable to transmit data by a lower layer to a radio section by segmenting and concatenating data received from a higher layer. In addition, to ensure a variety of quality of service (QoS) required by each radio bearer (RB), the RLC layer provides three operation modes, i.e., a transparent mode (TM), an unacknowledged mode (UM), and an acknowledged mode (AM). In particular, the AM RLC performs a retransmission function by using an automatic repeat request (ARQ) for reliable data transmission.

A PDCP layer of the second layer performs a header compression function for decreasing an Internet protocol (IP) packet header size which is relatively great and which contains unnecessary control information in order to effectively perform transmission in a radio section having a small bandwidth when transmitting an IP packet such as IPv4 or IPv6. This serves to increase transmission efficiency of the radio section by allowing only necessary information to be transmitted in a header part of data. In addition, in the LTE system, the PDCP layer also performs a security function which consists of ciphering for avoiding data interception and integrity protection for avoiding data manipulation of a third party.

An RRC layer located in the uppermost part of the third layer is defined only in the C-plane. The RRC layer serves to control the logical channel, the transport channel, and the physical channel in association with configuration, reconfiguration and release of radio bearers (RBs). Herein, the RB implies a logical path provided by the first and second layers for data delivery between the UE and the UTRAN. In general, the setup of the RB implies a process for specifying a radio protocol layer and channel properties required to provide a particular service and for determining respective detailed parameters and operations. The RB can be classified into two types, i.e., a signaling RB (SRB) and a data RB (DRB). The SRB is used as a path for transmitting an RRC message in the C-plane. The DRB is used as a path for transmitting user data in the U-plane.

Examples of a downlink transport channel for transmitting data from the network to the UE include a broadcast channel (BCH) for transmitting system information and a downlink shared channel (SCH) for transmitting user traffic or a control message. A control message or traffic of downlink multicast or broadcast services may be transmitted through the downlink SCH, or may be transmitted through an additional downlink multicast channel (MCH). Meanwhile, examples of an uplink transport channel for transmitting data from the UE to the network include a random access channel (RACH) for transmitting an initial control message and an uplink shared channel (SCH) for transmitting user traffic or a control message.

Examples of a logical channel located on a higher layer of the transport channel and mapped to the transport channel include a broadcast channel (BCCH), a paging control channel (PCCH), a common control channel (CCCH), a multicast control channel (MCCH), a multicast traffic channel (MTCH), etc.

A physical channel consists of several sub-frames located on a time axis and several sub-carriers located on a frequency axis. Herein, one sub-frame consists of a plurality of symbols on the time axis. One sub-frame consists of a plurality of RBs. One RB consists of a plurality of symbols and a plurality of sub-carriers. In addition, each sub-frame may use specific sub-frames of specific symbols (e.g., a first symbol) of a corresponding sub-frame for a physical downlink control channel (PDCCH), i.e., L1/L2 control channels. One sub-frame has a length of 0.5 ms. A transmission time interval (TTI) which is a unit time for data transmission is 1 ms corresponding to two sub-frames.

Hereinafter, an RRC state of a UE and an RRC connection method will be described. The RRC state implies whether an RRC of the UE is logically connected to an RRC of an E-UTRAN. If connected, it is an RRC_CONNECTED state, and if not connected, it is an RRC_IDLE state. Since the RRC connection exists in the UE in the RRC_CONNECTED state, the E-UTRAN can recognize a presence of the UE in a cell unit, and thus can effectively control the UE. On the other hand, the UE in the RRC_IDLE state cannot recognize the presence of the UE, and is managed by the core network in a tracking area (TA) unit which is a greater area unit than a cell. That is, regarding the UE in the RRC_IDLE state, only the presence/absence of the UE is recognized in the greater area unit than the cell, and in order to receive a mobile communication service such as voice and data, the UE must transition to the RRC_CONNECTED state. Each TA is identified by using a tracking area identifier (TAI). The UE can configure the TAI by using a tracking area code (TAC) as information which is broadcast in the cell.

When the user first turns on power of the UE, the UE first searches for a proper cell and thereafter establishes an RRC connection in the cell, and then registers information of the UE to the core network. Thereafter, the UE remains in the RRC_IDLE state. The UE in the RRC_IDLE state (re)selects a cell according to necessity, and examines system information or paging information. This is called that the UE camps on the cell. The UE in the RRC_IDLE state establishes an RRC connection with an RRC of an E-UTRAN through an RRC connection procedure only when there is a need to establish the RRC connection, and then transitions to the RRC_CONNECTED state. There are several cases where the UE in the RRC_IDLE state needs to establish the RRC connection. Examples of the cases include a case where uplink data transmission is required due to user's call attempts or a case where a response message is transmitted in response to a paging message upon receiving the paging message from an E-UTRAN.

Hereinafter, a paging procedure and an operation of a UE when a corresponding message is received will be described. Paging is used in case of delivering paging information by a core network to a UE in the RRC_IDLE state, in case of reporting a change in system information, and in case of delivering emergent information. Further, paging is used in case of reporting the change in the system information by a BS to a UE in the RRC_CONNECTED state.

As described above, since location information on the UE in the RRC_IDLE state is managed by the core network in a TA unit, the core network does not know a cell in which the UE is currently located. Accordingly, the core network delivers a paging message to all BSs included in a TA list, and upon receiving the paging message, the BS broadcasts the paging message in a cell of the BS. In this case, the BS broadcasts the paging message in a paging occasion (PO). The PO is a sub-frame for providing information on transmission of the paging message, and is calculated based on an ID of the UE. The UE in the RRC_IDLE state reads the subframe by calculating the PO on the basis of the ID of the UE. The UE receives the paging message on the basis of information regarding reception of the paging message delivered through the subframe, and determines whether the ID of the UE is included in the message. If the ID of the UE is included in the message, the UE establishes an RRC connection, or receives system information, or reads emergent information. Otherwise, if the ID of the UE is not included in the received paging message, the UE discards the paging message.

Next, system information will be described. The system information includes essential information that must be known to a UE to access a BS. Thus, the UE has to completely receive system information before accessing the BS. Further, the UE has to always have the latest system information. Since the system information is information that must be known to all UEs in one cell, the BS periodically transmits the system information.

The system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, one SIB includes only information of a neighbor cell, and another SIB includes only information of an uplink radio channel used by the UE.

Hereinafter, cell (re)selection will be described. When power of a UE is turned on, the UE must select a cell having proper quality to perform preparation procedures for receiving a service. The UE in an RRC_IDLE state must select the cell having proper quality all the time, and thus must be prepared to receive the service through the cell. For example, the UE of which power has been just turned on must select the cell having proper quality so as to be registered to a network. If the UE which has been in an RRC_CONNECTED state enters the RRC_IDLE state, the UE must select a cell in which the UE itself resides. In this manner, a process of selecting a cell satisfying a certain condition by the UE in order to remain in a service waiting state such as the RRC_IDLE state is called a cell selection. The cell selection is performed in a state where the UE does not currently determine a cell in which the UE itself resides in the RRC_IDLE state, and thus it is very important to select the cell as quickly as possible. Therefore, if a cell provides radio signal quality greater than or equal to a specific criterion, the cell may be selected in the cell selection process of the UE even if the cell is not a cell providing best radio signal quality to the UE.

If the UE selects a cell satisfying the cell selection criterion, the UE receives information required for an operation of the RRC IDLE state of the UE, that is, an RRC_IDLE mode operation, in the corresponding cell from the system information of the corresponding cell. The UE receives all the information required for the RRC_IDLE mode operation, and then waits in an idle mode to request a service (for example, originating call) to a network or receive the service (for example, terminating call) from the network.

After the UE selects a certain cell through a cell selection process, the signal strength and quality between the UE and the BS may be changed due to the change of a UE mobility and a wireless environment. Therefore, if the quality of the selected cell deteriorates, the UE may select another cell providing better quality. If a cell is reselected in this manner, a cell providing signal quality better than that of a currently selected cell is selected in general. This process is called a cell reselection. A basic purpose of the cell reselection process is generally to select a cell providing best quality to the UE from the perspective of the radio signal quality. In addition to the perspective of the radio signal quality, the network may notify the UE of its priority by determining the priority for each frequency. The UE which has received the priority may consider this priority more preferentially than the radio signal quality criterion during the cell reselection process.

Figure 4:
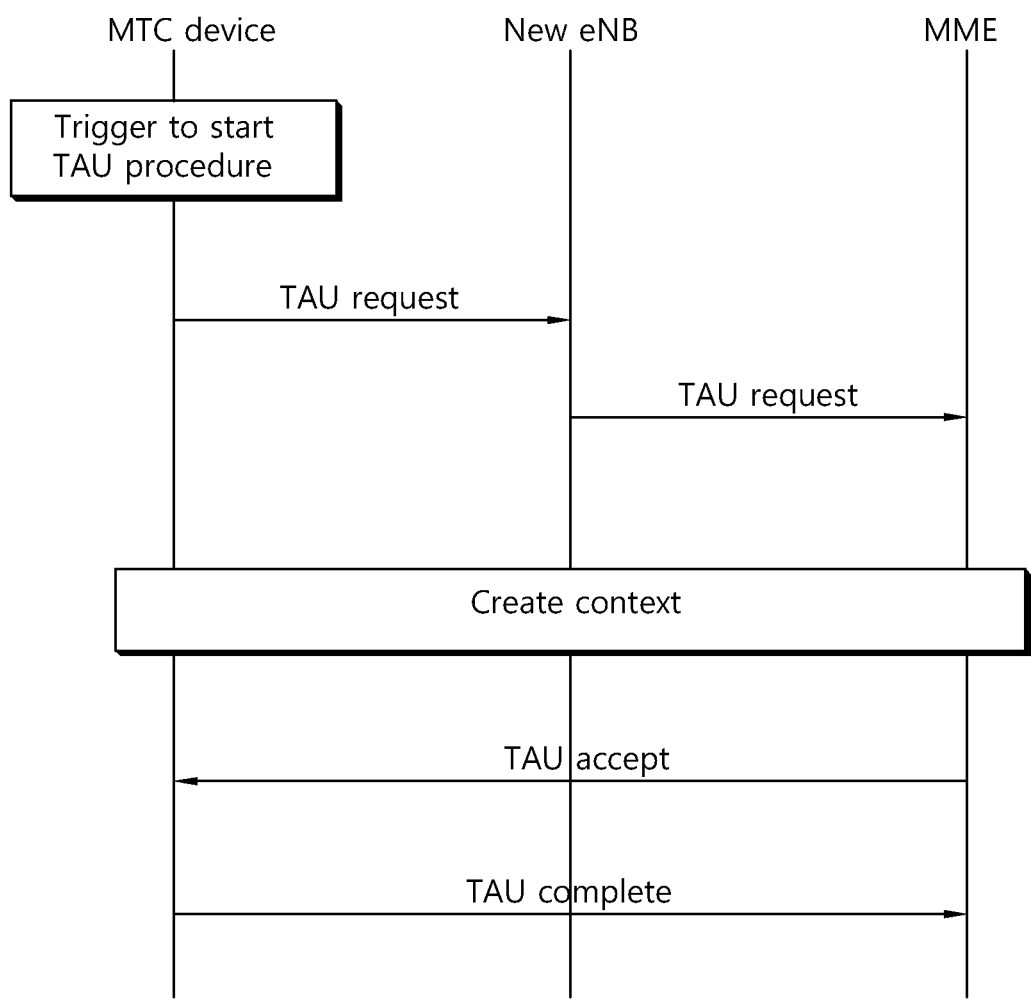
FIG. 4 is a message flowchart simply showing a TA update procedure.

FIG. 4 is a message flowchart simply showing a TA update procedure.

A UE in an RRC_IDLE state performs a tracking area update (TAU) procedure to report a current location of the UE to a core network in a case where the UE moves to a different TA which is not present in a TAI list received from the core network or in a case where a timer for a periodic TAU expires. When the UE moves to the different TA, the UE recognizes that the TA is changed by using the following method. The UE (re)selects a cell and receives system information which is broadcast from the selected cell. If a TAI configured by using a TAC obtained from the received system information does not exist in the TAI list stored in the UE, the UE recognizes that the TA is changed, and starts the TAU procedure.

When the TAU procedure starts, the UE transmits a TAU request message to the core network via a BS. Upon receiving the message, the core network performs the same role as receiving of information regarding the UE from another network.

Figure 5:
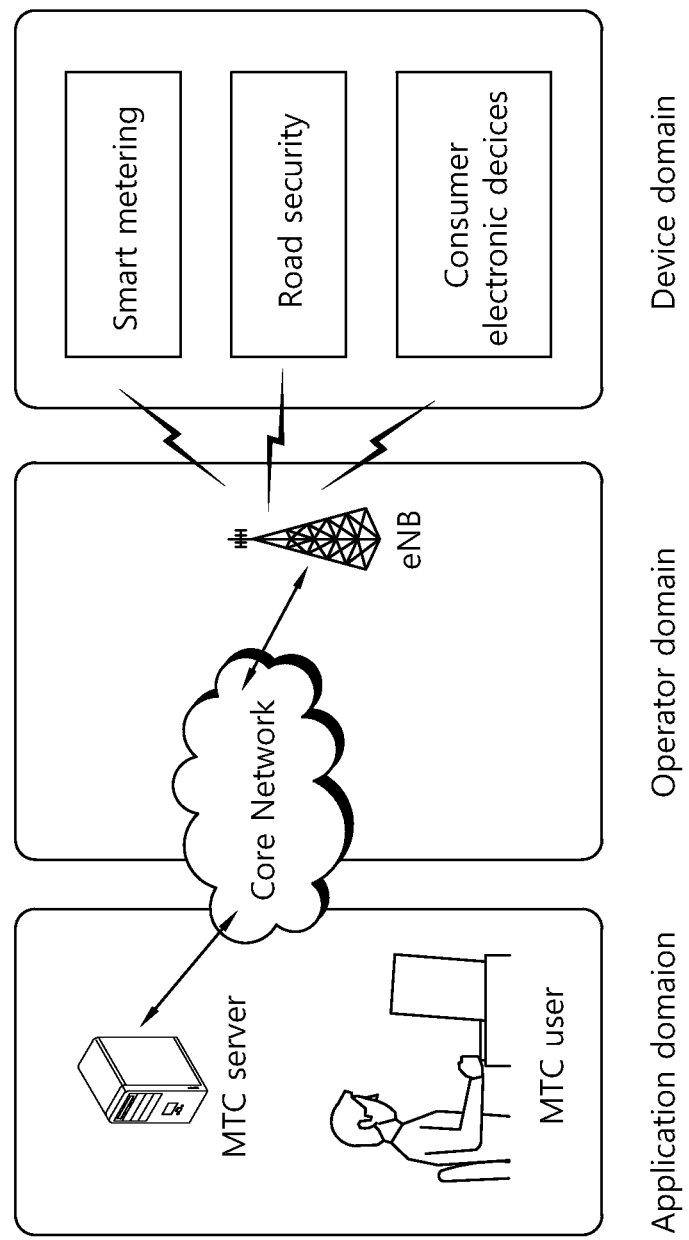
FIG. 5 shows an overall structure of an MTC system applicable to the present invention.

FIG. 5 shows an overall structure of an MTC system applicable to the present invention. An MTC device communicates with another MTC device or an MTC server through a mobile communication network (i.e., PLMN). The MTC server can provide an MTC user with metering, road information, consumer electronic device control, etc., provided via the MTC device as shown in FIG. 5.

To effectively support the MTC service, a property of the MTC device can be taken into account. The property of the MTC device may be low mobility, time tolerance, small data transmission, etc. In addition, it must be considered that many MTC devices can exist in one cell.

Although it is described hereinafter that the present invention applies to an MTC system for convenience of explanation, this is for exemplary purposes only, and thus present invention is not limited thereto. The present invention can apply to various communication systems having all or some of the aforementioned properties of the MTC device, for example, the low mobility, the time tolerance, the small data transmission, and the existence of a plurality of UEs in one cell.

As described above, in case of the conventional paging procedure, the core network delivers a paging message to all BSs existing in the TAI list to perform paging on one UE, and BSs which receive the paging message broadcast the paging message to their respective cells. However, in many cases, an MTC device used in metering and payment systems described as an exemplary case to which the present invention is applicable does almost not move after starting its operation, or moves in a short distance even if it moves. When the core network recognizes locations of the MTC devices which have low mobility or have almost no mobility and perform paging similarly to the conventional case, a load may be generated between the core network and a radio interface due to a great number of MTC devices.

In order to solve the problem of the conventional technique, for a case where a UE is used for a specific purpose or a case where a cell is changed while a TAU does not occur when a plurality of UEs having low mobility exist in one cell or a TA for a specific purpose newly defined in the present invention is changed, the present invention proposes a method and apparatus for updating location information for reporting the change by the UE to a BS.

Hereinafter, the UE may be a UE having low mobility, and a plurality of UEs may exist in one cell. For a detailed example, the UE may be an MTC device of an MTC system. It may be assumed that the UE operates in the RRC_IDLE state.

A cell to which the UE belongs may be changed due to a movement of the UE or a change in a cell range. The changed cell implies a cell having an identifier (ID) different from that of a cell in which the UE previously resides. The change in the cell can be determined by comparing a cell ID stored in the UE and a cell ID that can be obtained through system information which is broadcast in a (re)selected cell.

If there is a change in a cell in which the UE operating in the RRC_IDLE state resides, the UE can report to the core network that the cell in which the UE resides is changed via the BS. As an exemplary procedure for updating the location information of the UE, the UE can use the conventional TAU procedure. In this case, content required to update the location information of the UE can be added to a TAU request message used in the conventional TAU procedure. For example, the TAU request message can be transmitted by adding a UE (e.g., MTC device) ID and a cell ID to the message. Herein, the UE ID is an ID of a UE of which a residing cell is changed, and the cell ID is an ID of a cell newly selected by the UE.

In a case where the conventional TAU procedure is used as described above in order for the UE to report to the core network that the cell in which the UE resides is changed, in addition to a method of transmitting the UE ID and the cell ID by adding the IDs to the TAU request message, a cell change report message for reporting the change of the cell can be transmitted in another example. The cell change report message may include an ID of a UE of which a residing cell is changed, an ID of a new cell, and an ID of a core network. Herein, the ID of the core network is an ID of a previous core network for receiving information of the UE.

According to another embodiment of the present invention, an additional TA for the MTC device can be newly defined and used. That is, a newly confirmed TA for an MTC device differentiated from the conventional TA can be used in comparison with the aforementioned invention which confirms the location information of the MTC device in a cell unit and reports a cell change to the core network if a cell in which the MTC device resides is changed. The newly configured TA for the MTC device is called a $TA_{MTC}$ to be distinguished from the conventional TA, and an ID of the $TA_{MTC}$ is called a $TAI_{MTC}$. That is, the $TA_{MTC}$ is used by only an MTC device differentiated from a TA used by a normal UE.

The $TA_{MTC}$ can be configured with one or more cells. A BS which supports the $TA_{MTC}$ can broadcast both a TAC of a TA for a normal UE and a $TA_{MTC}$ of a $TAC_{MTC}$ for an MTC device (including a case where the normal UE performs an MTC function). The UE can distinguish the TA and the $TA_{MTC}$ by using the TAC and the $TAC_{MTC}$ which are broadcast by the BS.

Through comparison with the $TAC_{MTC}$ broadcast by the BS and the TAI stored in the UE, the UE can know whether the $TA_{MTC}$ is changed and can determine whether to report the occurrence of change. The UE can receive a TAI list $TAI_{MTC}$ for MTC from the core network before reporting that there is change in the $TA_{MTC}$.

When the $TA_{MTC}$ is changed as a comparison result of the $TAC_{MTC}$ broadcast by the BS and the $TAI_{MTC}$ list stored in the UE, the UE reports the change of the $TA_{MTC}$ to the core network via the BS.

In this case, the UE can report $TA_{MTC}$ change information by using a TAU request message used in the conventional TAU procedure. When the UE performs the $TA_{MTC}$ change by using the conventional TAU procedure, the TAU request message transmitted by the UE may include a $TAI_{MTC}$ which is configured on the basis of an additional $TAC_{MTC}$ for MTC.

Hereinafter, the aforementioned embodiments of the present invention will be described with reference to FIG. 6 to FIG. 8.

Figure 6:
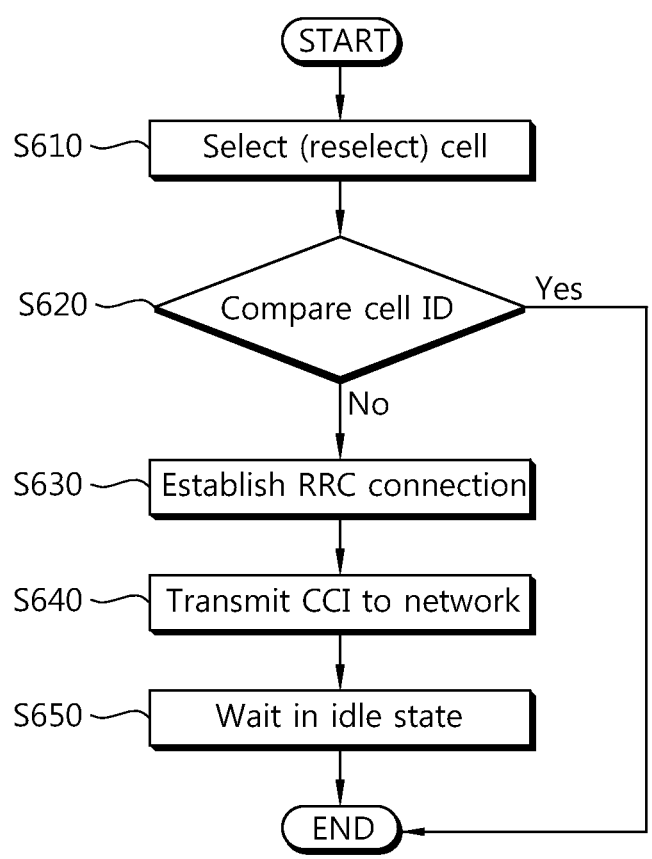
FIG. 6 is a flowchart showing a method of reporting a cell change of an MTC device according to an embodiment of the present invention.

FIG. 6 is a flowchart showing a method of reporting a cell change of an MTC device according to an embodiment of the present invention.

In an example of FIG. 6, a core network manages a location of the MTC device in a cell unit. In the present invention, when cell selection or cell reselection is performed or when there is a change in a cell in which the device resides, the MTC device transmits a cell change indication (CCI) message to a BS of the cell. The MTC device can know that the (re)selected cell is different from a previous cell according to whether an ID of the (re)selected cell is equal to an ID of the previous cell. The MTC device can recognize the ID of the (re)selected cell by receiving system information from the (re)selected cell. If a cell ID which is broadcast from the (re)selected cell is different from the existing cell ID stored in the MTC device, the MTC device may determine that the cell is changed and then transmit a CCI to the core network. If the two cell IDs are equal to each other, the MTC device does not transmit the CCI to the core network.

An operation of the aforementioned will be described in detail step by step with reference to FIG. 6.

An MTC device in an RRC_IDLE state (re)selects a cell according to the conventional cell (re)selection procedure (step S610).

The MTC device compares an ID of the (re)selected cell and an ID of a cell in which the MTC device previously resides and thus determines whether the two IDs are equal to each other (step S620). The ID of the re(selected) cell can be recognized through system information by receiving the system information broadcast in the (re)selected cell.

If the ID of the re(selected) cell is different from the ID of the cell in which the MTC device previously resides, the MTC device stores the received cell ID of the (re)selected cell, and establishes an RRC connection in the (re)selected cell (step S630).

The MTC device transmits a CCI message to the core network via the BS (step S640). In this case, the CCI message includes an MTC device ID and a cell ID.

The MTC device transitions to the RRC_IDLE state and waits in the RRC_IDLE state (step S650).

Figure 7:
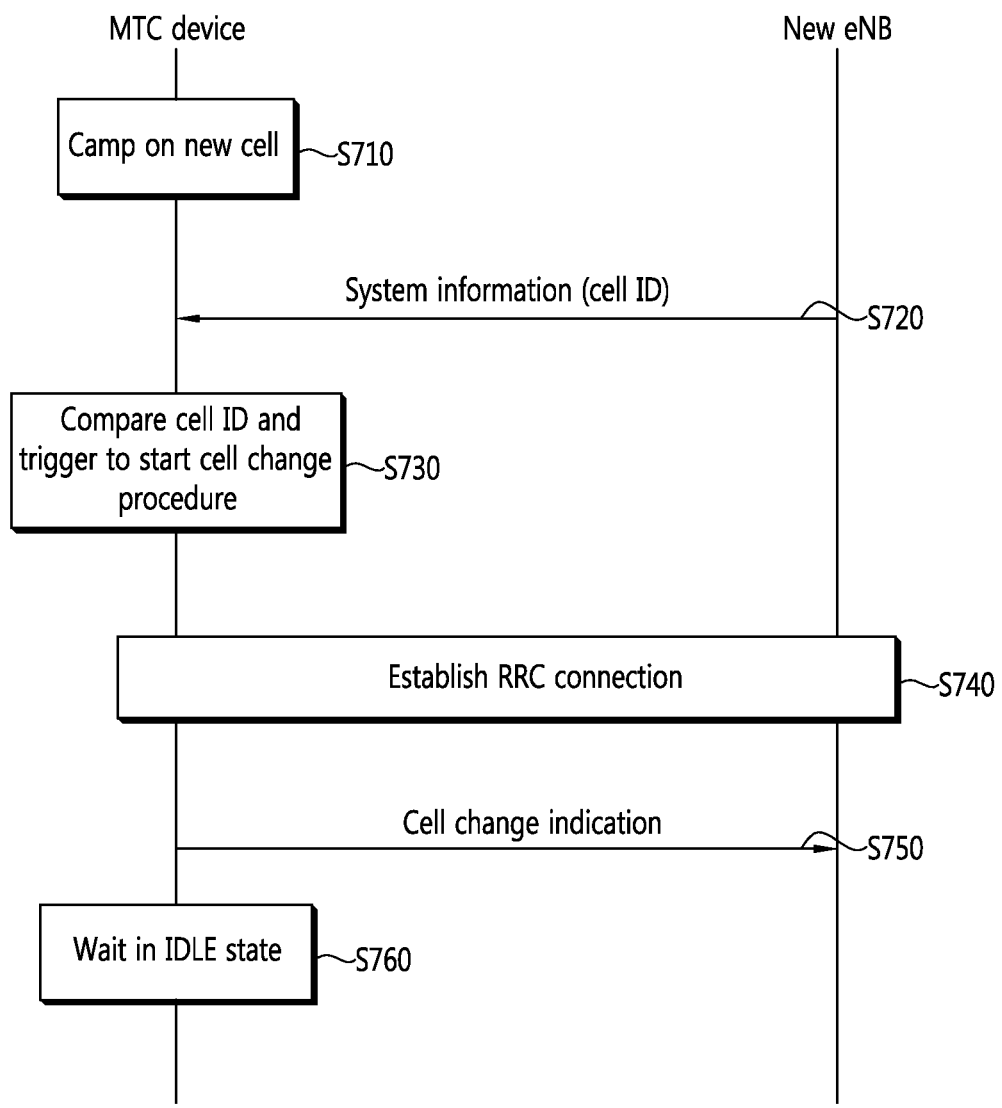
FIG. 7 is a message flowchart showing signaling between an MTC device and a BS in the embodiment of FIG. 6.

FIG. 7 is a message flowchart showing signaling between an MTC device and a BS in the embodiment of FIG. 6.

The MTC device camps on a new cell through a cell (re) selection procedure (step S710), and receives system information which is broadcast in a (re)selected cell (step S720). In this case, the system information transmitted by the BS includes a cell ID.

The MTC device compares a cell ID of a cell in which the MTC device resides and a cell ID of the (re)selected cell obtained from the system information received in step S720 and determines whether to start a procedure for reporting a cell change (step S730). If the cell is changed, the MTC device may establish an RRC connection to report the cell change (step S740), may transmit a cell change report message (step S750), and may transition to an RRC_IDLE state and then wait in the RRC_IDLE state (step S760).

Figure 8:
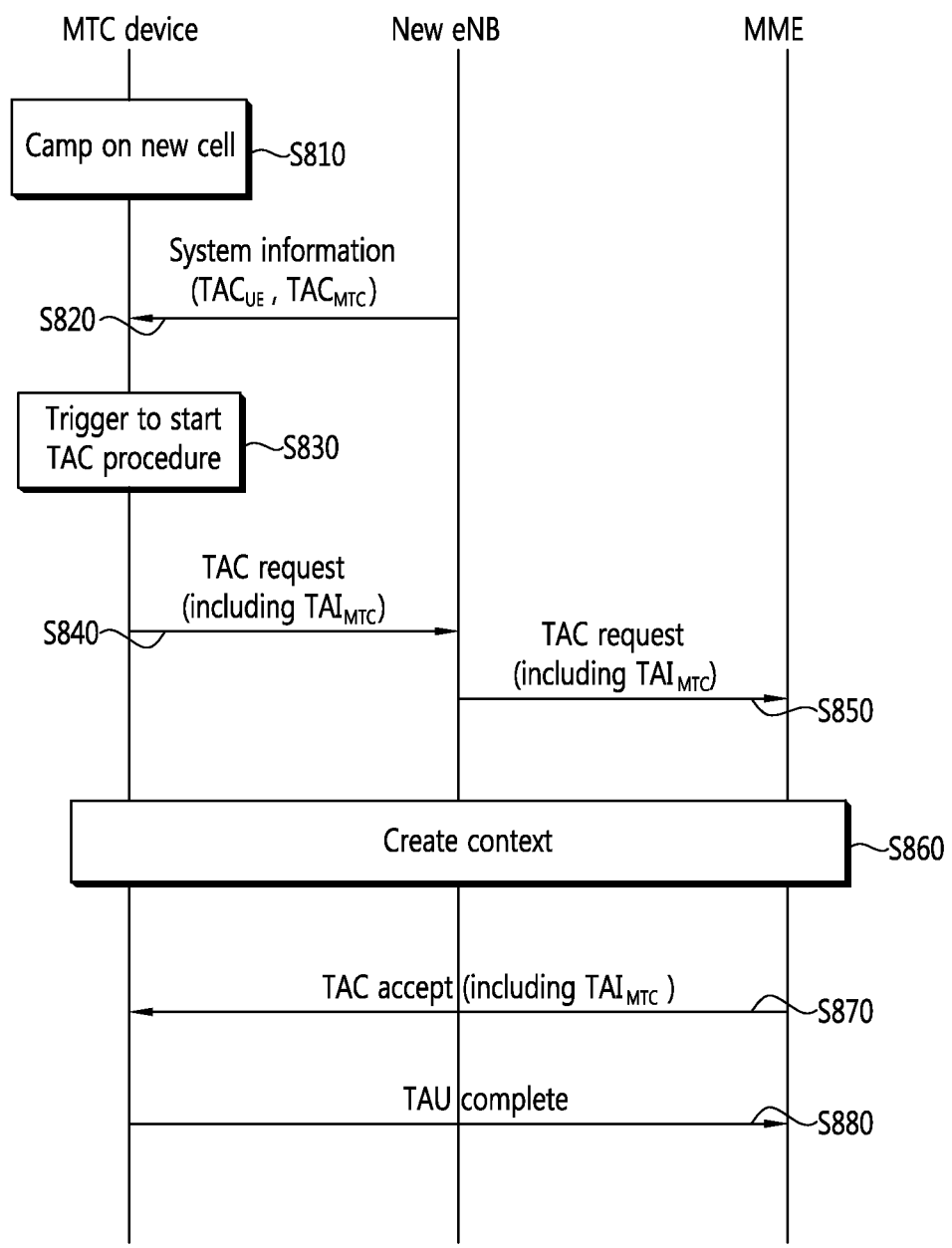
FIG. 8 is a message flowchart showing an operation of an MTC device according to another embodiment of the present invention.

FIG. 8 is a message flowchart showing an operation of an MTC device according to another embodiment of the present invention.

An example of FIG. 8 describes a method for determining a specific TAC used by a UE to perform a TAU procedure according to a device configuration when a network additionally configures a TA for MTC (i.e., $TA_{MTC}$) and broadcasts not only a TAC used by a normal UE but also an additional $TAC_{MTC}$ for MTC. The following aspects are assumed for the present embodiment.

After cell (re)selection, the MTC device receives system information which is broadcast in a (re)selected cell, and determines whether the TA is changed by using a TAI list stored therein and the $TAC_{MTC}$ which is broadcast in the cell.

In the determining of whether the TA is changed, if a TAI configured by using the $TAC_{MTC}$ broadcast in the cell exists in the TAI list, the MTC device regards that the TA change is not achieved.

If the TAI configured by using the $TAC_{MTC}$ broadcast in the cell does not exist in the stored TAI list, the MTC device stores a new $TAC_{MTC}$ value, and reports the TA change to the core network.

The aforementioned procedures can be explained step by step as follows.

The MTC device (re)selects a new cell and camps on the cell (step S810). After camping on, the MTC device receives system information in the new cell (i.e., the (re)selected cell) (step S820). In this case, the system information includes a TAC of a normal UE (i.e., $TAC_{UE}$) and a TAC for MTC (i.e., $TAC_{MTC}$).

The MTC device determines that a $TAI_{TAC}$ configured based on the $TAC_{MTC}$ received in the new cell does not exist in the stored TAI list, and starts a TAU procedure (step S830).

The MTC device configures a TAI on the basis of the $TAC_{MTC}$ thereof before the cell change and adds the configured TAI to a TAU request message, and thereafter transmits the corresponding message to a BS (step S840). The BS transmits the received TAU request message to the core network (step S850). The TAU request message of steps S840 and S850 includes a TAI configured based on the $TAC_{MTC}$.

The core network generates context (step S860). That is, a new core network receives information of the MTC device from a previous core network and then stores the information.

The core network configures a TAI list on the basis of the $TAC_{MTC}$, adds the TAI list to a TAU accept message, and thereafter delivers it to the MTC device through UE-specific signaling (step S870).

The MTC device reports to the core network that the corresponding message is received correctly by using a TAU complete message (step S880).

Figure 9:
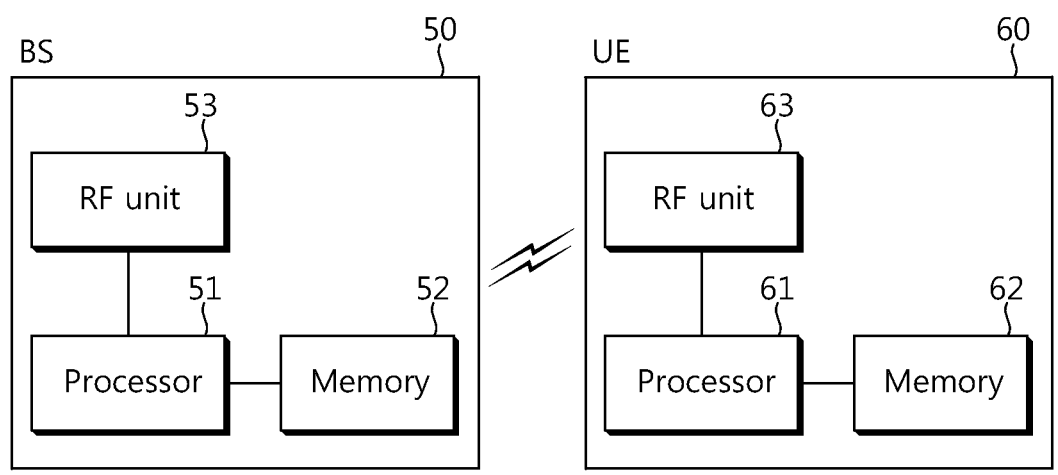
FIG. 9 is a block diagram showing a wireless communication system according to an embodiment of the present invention.

FIG. 9 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal.

The processor 51 implements the proposed functions, procedures, and/or methods. Layers of a radio interface protocol can be implemented by the processor 51. The processor 51 can implement an operation of the BS in the procedure described with reference to FIG. 4 and in the embodiments described with reference to FIG. 6 to FIG. 8.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal.

The processor 61 implements the proposed functions, procedures, and/or methods. Layers of a radio interface protocol can be implemented by the processor 61. The processor 61 can implement an operation of the UE in the procedure described with reference to FIG. 4 and in the embodiments described with reference to FIG. 6 to FIG. 8.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of transmitting cell change indication information, which is performed by a terminal in a wireless communication system, the method comprising:
    selecting or reselecting a second cell from a first cell;
    comparing a first cell identifier (ID) of the first cell with a second cell ID of the second cell, or comparing a first tracking area code (TAC) of the first cell with a second TAC of the second cell; and
    transmitting the cell change indication information to a network when the result of the comparison shows that the first cell ID does not match the second cell ID or the first TAC does not match the second TAC,
    wherein the terminal is a machine type communication (MTC) terminal performing a communication without human intervention, and the MTC terminal has a limited mobility,
    wherein the cell change indication information includes an ID of the MTC terminal, the second cell ID, and a tracking area (TA) ID, and
    wherein the tracking area is a newly defined tracking area that is configured only for the MTC terminal.

2. The method of claim 1, wherein the TA ID is in association with the second TAC.

3. The method of claim 1, further comprising receiving at least one of the first TAC and the second TAC through system information.

4. The method of claim 1, further comprising storing at least one of the received first TAC and second TAC.

5. A method of receiving cell change indication information by a network in a wireless communication system, the method comprising:
    transmitting system information including at least one of a first tracking area code (TAC) of a first cell and a second TAC of a second cell to a machine type communication (MTC) device, wherein the MTC device performs a communication without human intervention, and the MTC device has a limited mobility, and wherein the first TAC of the first cell is compared with the second TAC of the second cell by the MTC device; and
    receiving the cell change indication information from the MTC device, wherein the cell change indication information is received when the first TAC of the first cell is not matched with the second TAC of the second cell, wherein the cell change indication information includes an ID of the MTC device, a tracking area (TA) ID, and wherein the tracking area is a newly defined tracking area that is configured only for the MTC device.

6. The method of claim 5, wherein the TA ID is in association with the second TAC.

7. The method of claim 5, further comprising storing the received cell change indication information.

* * * * *